(12) United States Patent
Lin

(10) Patent No.: US 7,961,425 B2
(45) Date of Patent: Jun. 14, 2011

(54) PROTECTION STRUCTURE TO RECEIVE A PORTABLE MEMORY DEVICE WITH LESS LOCKING STRUCTURE

(75) Inventor: Hugo Lin, Taipei Hsien (TW)

(73) Assignee: Durapower Technology Ltd., New Taipei (TW)

( * ) Notice: Subject to any disclaimer, the term of this patent is extended or adjusted under 35 U.S.C. 154(b) by 764 days.

(21) Appl. No.: 12/024,104

(22) Filed: Jan. 31, 2008

(65) Prior Publication Data

US 2008/0186622 A1 Aug. 7, 2008

(30) Foreign Application Priority Data

Feb. 2, 2007 (TW) .............................. 96202011 U

(51) Int. Cl.
*H05K 5/03* (2006.01)
(52) U.S. Cl. ................. 360/97.01; 361/679.37; 206/723
(58) Field of Classification Search ............... 369/275.5; 206/728, 723, 724, 722, 726, 727, 719, 721, 206/521, 588
See application file for complete search history.

(56) References Cited

U.S. PATENT DOCUMENTS

| 5,484,063 | A | * | 1/1996 | Cuccio et al. ................. 206/722 |
| 5,983,073 | A | * | 11/1999 | Ditzik ........................ 455/11.1 |
| 6,304,440 | B1 | * | 10/2001 | Lin ........................ 361/679.34 |
| 2002/0036149 | A1 | * | 3/2002 | Kwong ...................... 206/308.3 |
| 2005/0257949 | A1 | * | 11/2005 | Lalouette ....................... 174/50 |

* cited by examiner

*Primary Examiner* — Craig A. Renner
*Assistant Examiner* — Tamara Ashford

(57) ABSTRACT

A cover assembly for a portable hard disk comprises an assembling unit having a frame hole at a front side thereof; the assembling unit having an opening; the opening causing the assembling unit being divided into an upper portion and a lower portion; two ribs serving to divide the frame hole and the opening; a chain being movably installed to the opening; a hard disk combined to the circuit unit; the circuit unit having holes corresponding to a bottom of the hard disk; an upper cover combining to an upper side of the upper portion of the assembling unit; a base combining to a lower side of the lower portion of the assembling unit and being almost identical to the cover; the upper cover and the base being formed with a space for receiving a data storage unit.

9 Claims, 5 Drawing Sheets

PROTECTION STRUCTURE TO RECEIVE A PORTABLE MEMORY DEVICE WITH LESS LOCKING STRUCTURE

FIELD OF THE INVENTION

The present invention relates to computer devices, and particular to a protection structure to receiving a portable memory device with less locking structure. A chain is used to open or close the cover for enclosing the hard disk so that the present invention can provide a sufficient space for receiving the hard disk. The chain is combined to an assembling unit by adhesion, hot-press, or seaming, etc.

BACKGROUND OF THE INVENTION

Generally, a portable hard disk must be assembled with a shock and vibration proof assembly so as to protect the data stored in the hard disk without being destroyed due to collision and falling out. Thus the work will not stop because the data in the hard disk can be read.

Referring to FIG. 1, a prior art hard disk with vibration proof structure disclosed in Taiwan Patent No. M272203 or 539219 is illustrated. In that, a lower casing 11 of a portable memory device 10 is installed with a plurality of supporting posts 111. Each post 111 is enclosed by a soft adhesive glue 112. A hard disk 10 is fixed to a circuit board 12. The circuit board 12 with the hard disk 10 is retained to the soft adhesive glue 112 with the hard disk 10 being suspended so as to have a preferred vibration proof effect. In the patent M272203, inner sides of an upper casing and a lower casing are installed with vibration roof material which is positioned as the upper casing and lower cover are combined. From above prior arts, it is known that the vibration proof structure is very important.

SUMMARY OF THE INVENTION

Accordingly, the object of the present invention is to provide a protection structure to receiving a portable memory device with less locking structure. A chain is used to open or close the cover for enclosing the hard disk so that the present invention can provide a sufficient space for receiving the hard disk. The chain is combined to an assembling unit by adhesion, hot-press, or seaming, etc.

Furthermore, the structure of the present invention provides a shock proof structure which is installed at inner sides of the cover and the base. Vibration proof strips are installed in the connections of the components of the structure of the present invention. Furthermore, the present invention can be assembled easily.

In the present invention, the upper cover and base are made of hard material, such as colorful plastic material, fashioned metal material, or novel leather material which are combined with metal or plastic chain so as to provide a special appearance.

To achieve above object, the present invention provides a cover assembly for a portable hard disk, comprising: an assembling unit having a frame hole at a front side thereof; a plurality of communication ports being installed within the frame hole and being electrically connected to a circuit unit; the assembling unit having an opening; the opening causing the assembling unit being divided into an upper portion and a lower portion; two ribs serving to divide the frame hole and the opening; a chain being movably installed to the opening; one end of the chain having a head; by the movement of the chain, the assembling unit performing the operation of the separation and closing; a hard disk combined to the circuit unit; the circuit unit having holes corresponding to a bottom of the hard disk so that the hard disk being combinable to the circuit unit by using fixing units; an upper cover combining to an upper side of the upper portion of the assembling unit; a base combining to a lower side of the lower portion of the assembling unit and being almost identical to the cover; the upper cover and the base being formed with a space for receiving a data storage unit, pads being installed between the upper cover and the hard disk and between the base and the hard disk for vibration absorption and providing support to the hard disk.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
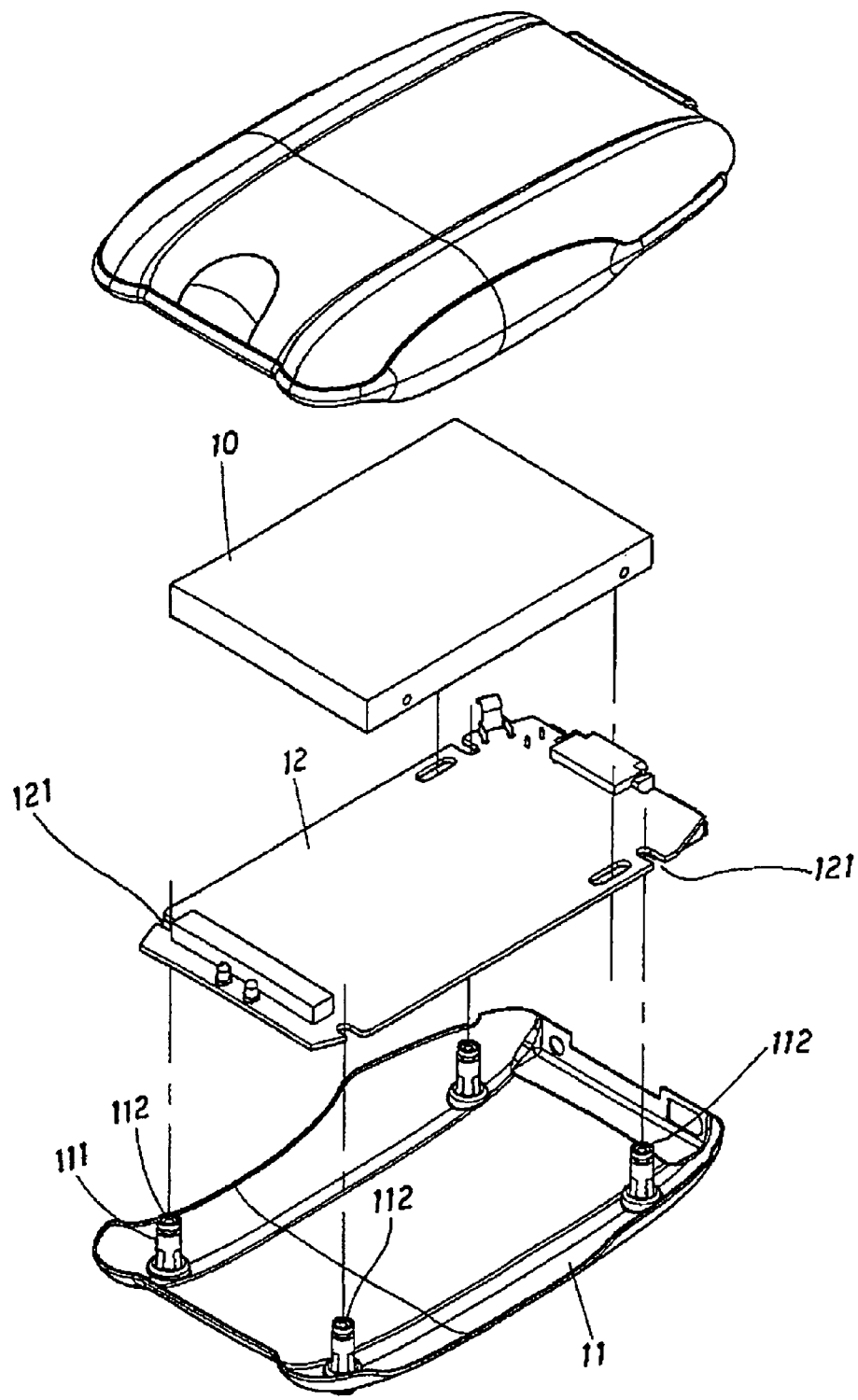
FIG. 1 is an exploded view show a prior art vibration proof hard disk.
Figure 2:
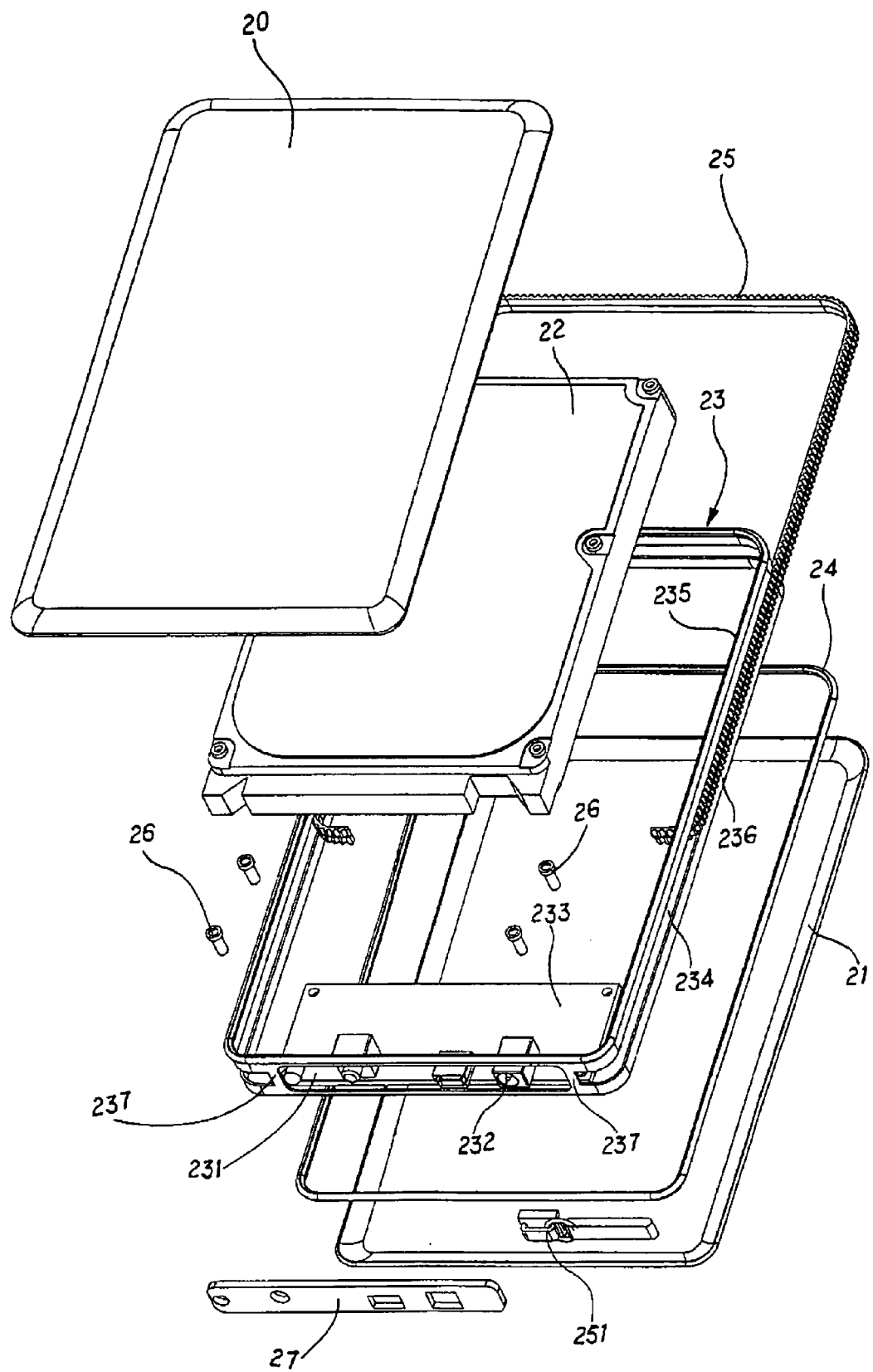
FIG. 2 is an exploded view of the structure of the present invention.

With referring to FIG. 1, the exploded view of the present invention is illustrated. The present invention has the following elements.

An assembling unit 23 has a frame hole 231 at a front side thereof. A plurality of communication ports 232 are installed within the frame hole 231 and are electrically connected to a circuit unit 233. The assembling unit 23 has an opening 234 which runs across at least three sides of the assembling unit 23. The opening 234 causes the assembling unit 23 being divided into an upper portion 235 and a lower portion 236. Two ribs 237 serve to divide the frame hole 231 from the opening 234. The assembling unit 23 is made of flexible material, such as plastic, cloth, etc. A chain 25 is movably installed to the opening 234. One end of the chain 25 has a head 251. By the movement of the chain 25, the assembling unit 23 performs the operation of the separation and closing. The chain 25 can be combined to the assembling unit 23 by adhesion, hot-pressing, seaming, etc.

A hard disk 22 is combined to the circuit unit 233. The circuit unit 233 has holes corresponding to a bottom of the hard disk 22 so that the hard disk 22 is combinable to the circuit unit 233 by using fixing units 26. The frame hole 231 at a front end of the assembling unit 23 has a slot plate 27 which has a specification suitable for the communication ports 232. The slot plate 27 serves to provide a supporting force to the hard disk 22. Other supporting to the hard disk 22 will be described hereinafter.

An upper cover 20 combines to an upper side of the upper portion 235 of the assembling unit 23.

A base 21 combines to a lower side of the lower portion 235 of the assembling unit 23 and is almost identical to the cover 20. The upper cover 20 and the base 21 are formed with a space for receiving a data storage unit, such as the hard disk 22 and a circuit unit 233. Pads can be installed between the upper cover 20 and the hard disk 22 and between the base 21 and the hard disk 22 for vibration absorption and providing support to the hard disk 22. The upper portion 235 and lower portion 235 can be combined to the assembling unit 23 by adhesion, hot-pressing, seaming, etc. Thus, the upper cover 20 and the base 21 are formed as an outer cover to cause the hard disk 22 to be supported therein.

Stripes can be installed between the upper cover 20 and the upper portion 235 and between the lower portion 235 and the base 21 for increasing contact area. The colors of the stripes 24 will beautify the appearance of the whole structure.

Figure 3:
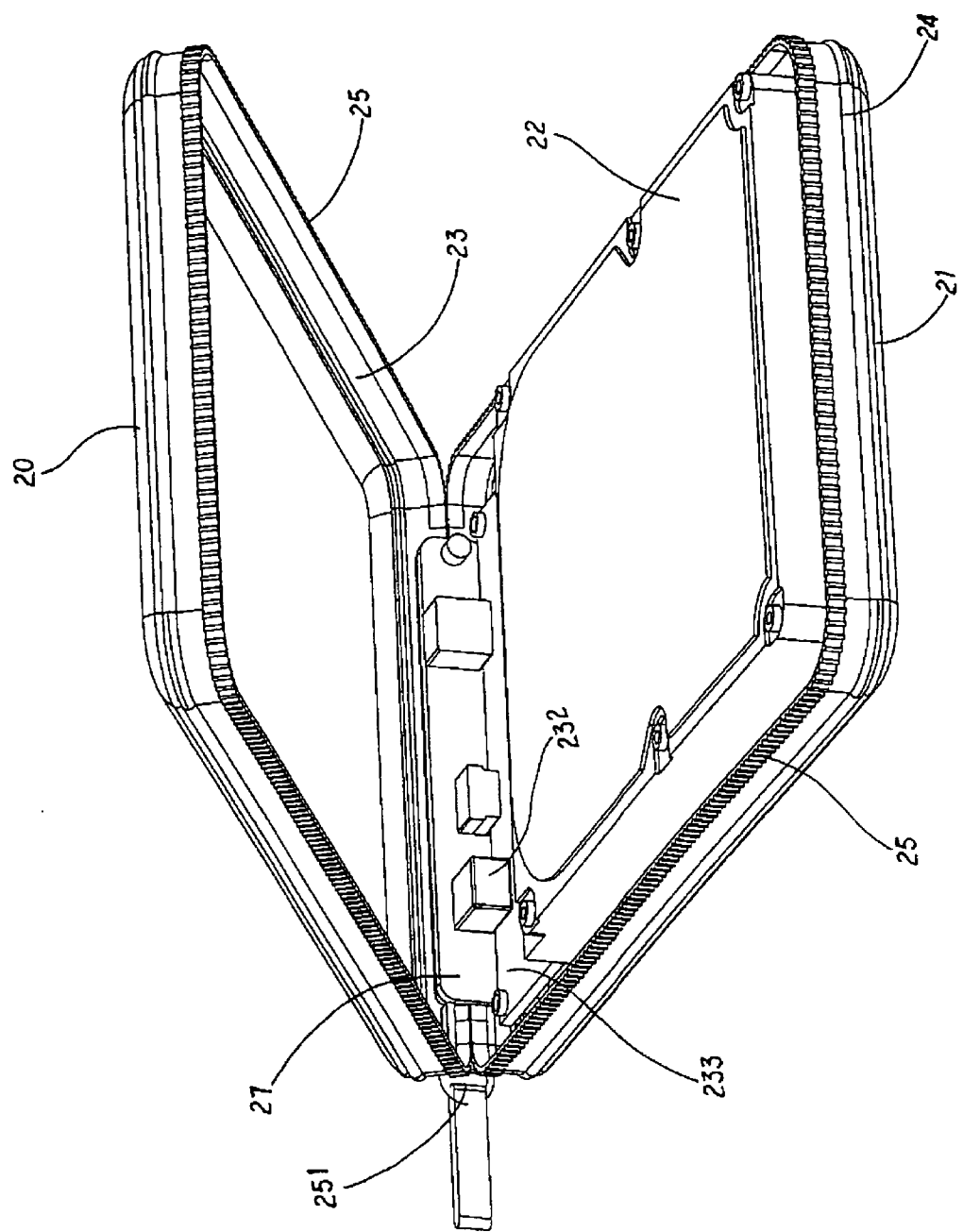
FIG. 3 is an assembled view of the structure of the present invention.

Referring to FIG. 3, the assembly of the present invention is illustrated. The hard disk 22 is assembled to the circuit unit 233. The circuit unit 233 and the communication ports 232 are fixed to the frame hole 231 at a front side of the assembling unit 23. The slot plate 27 is installed in the frame hole 231. The pads are installed at inner sides of the upper cover 20. Above mentioned components are enclosed in the space formed by the upper cover 20, the base 21 and the assembling unit 23. The chain 25 serves to open or close the opening 234 so that the upper cover 20 and the base 21 are opened and closed.

Figure 4:
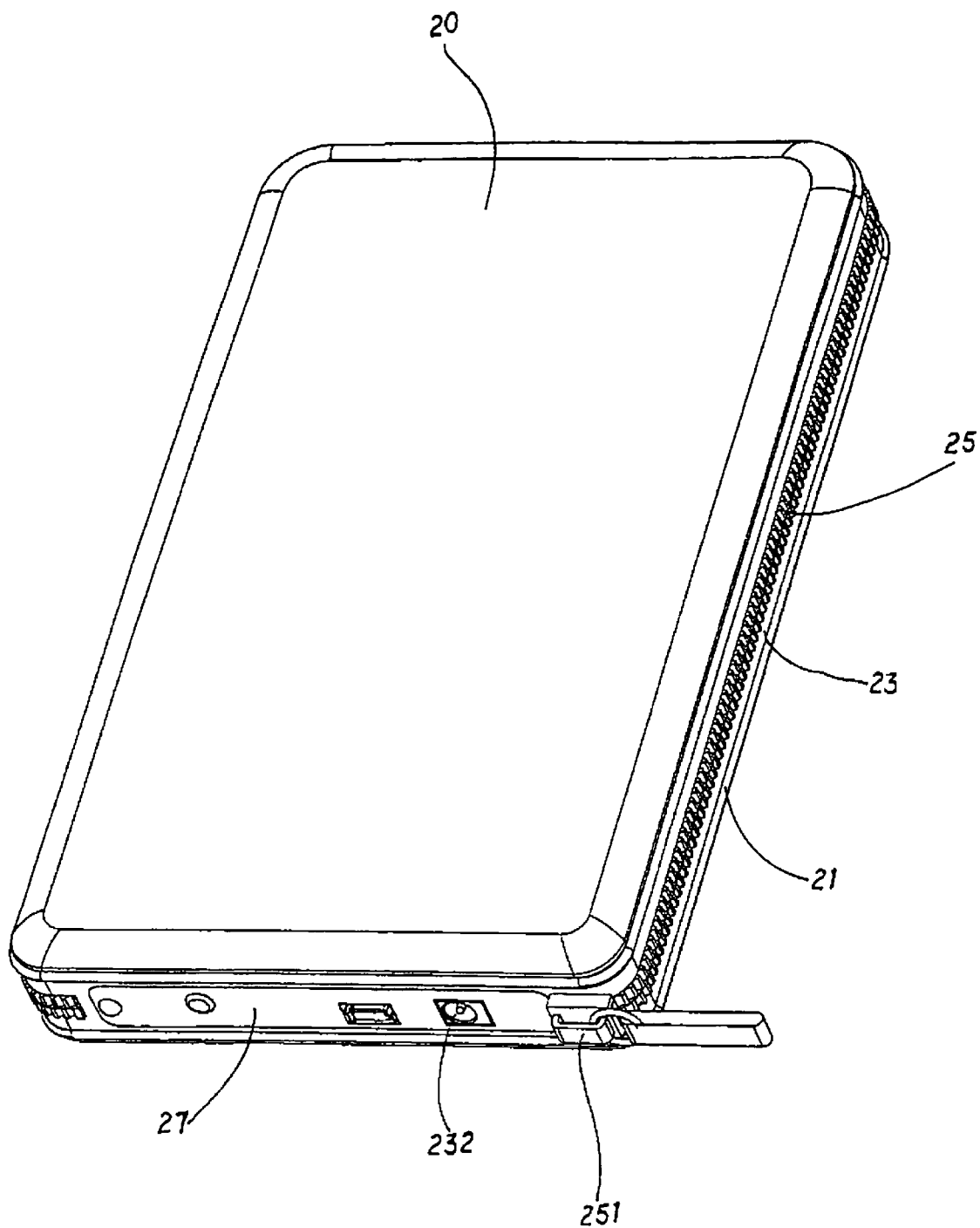
FIG. 4 is a perspective view of the structure of the present invention.
Figure 5:
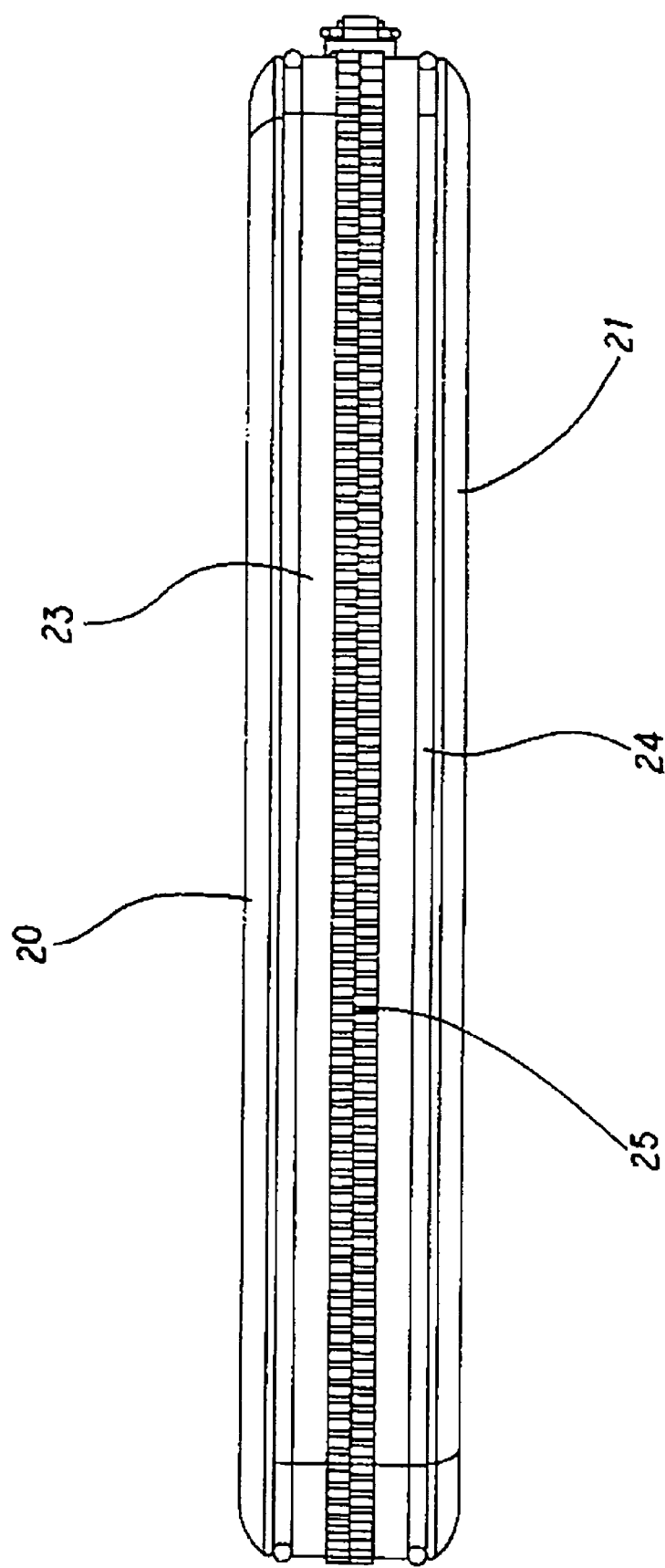
FIG. 5 is a lateral view of the present invention.

With referring to FIGS. 4 and 5, FIG. 4 shows that the chain 25 is closed. FIG. 5 shows a lateral view of the present invention. The communication ports 232 are hidden in the body. The structure is smooth without protrusion. In the present invention, a portable hard disk is received in a cover with a beautiful outlook. It only need open or close the chain for repair and maintenance with less cost and assembly time.

In the present invention, the upper cover 20 and base 21 may be made of plastic, metal, or leather or the combination of above materials.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cover assembly for a portable hard disk, comprising:
    an assembling unit having a frame hole at a front side thereof; a plurality of communication ports being installed within the frame hole; the assembling unit having an opening; the opening causing the assembling unit being divided into an upper portion and a lower portion; two ribs serving to divide the frame hale and the opening; a chain being movably installed to the opening; one end of the chain having a head; by the movement of the chain, the assembling unit performing the operation of the separation and closing;
    an upper cover combining to an upper side of the upper portion of the assembling unit;
    a base combining to a lower side of the lower portion of the assembling unit and having a shape almost identical to the cover; the upper cover and the base being formed with a space for receiving a data storage unit.

2. The cover assembly for a portable hard disk as claimed in claim 1, wherein the opening runs across at least three sides of the assembling unit and the movement of the chain will open or close the opening.

3. The cover assembly for a portable hard disk as claimed in claim 1, further comprising a circuit unit received in a space between the upper cover and the base; and the circuit unit having a plurality of communication ports for communicating with exterior devices.

4. The cover assembly for a portable hard disk as claimed in claim 3, wherein a hard disk is combined to the circuit unit.

5. The cover assembly for a Portable hard disk as claimed in claim 1, further comprising a slot plate installed upon a front side of the frame hole of the assembling unit; the slot plate has a specification suitable for the communication ports; the slot plate serves to provide a supporting force to the hard disk.

6. The cover assembly for a portable hard disk as claimed in claim 1, wherein the upper cover and base are made of material selected from plastic, metal, leather and the combination of plastic, metal, or leather.

7. The cover assembly for a portable hard disk as claimed in claim 1, wherein the assembling unit is flexible.

8. The cover assembly for a portable hard disk as claimed in claim 1, wherein stripes are installed between the upper cover and the upper portion.

9. The cover assembly for a portable hard disk as claimed in claim 1, wherein stripes are installed between the lower portion and the base for increasing contact area.

* * * * *